US011526729B2

(12) United States Patent
Tatsubori et al.

(10) Patent No.: US 11,526,729 B2
(45) Date of Patent: Dec. 13, 2022

(54) DISCOVERING HIGHER-LEVEL ACTIONS FROM EXPERT'S ACTION DEMONSTRATION

(71) Applicant: INTERNATIONAL BUSINESS MACHINES CORPORATION, Armonk, NY (US)

(72) Inventors: Michiaki Tatsubori, Kanagawa (JP); Roland Everett Fall, III, New Taipei (TW); Don Joven R. Agravante, Tokyo (JP); Masataro Asai, Tokyo (JP); Asim Munawar, Ichikawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 875 days.

(21) Appl. No.: 16/419,183

(22) Filed: May 22, 2019

(65) Prior Publication Data

US 2020/0372323 A1 Nov. 26, 2020

(51) Int. Cl.
*G06N 3/04* (2006.01)
*G06N 5/02* (2006.01)
(Continued)

(52) U.S. Cl.
CPC ......... *G06N 3/0454* (2013.01); *G06K 9/6215* (2013.01); *G06K 9/6231* (2013.01);
(Continued)

(58) Field of Classification Search
CPC ........ G06N 3/0454; G06N 3/049; G06N 3/08; G06N 5/022; G06K 9/6215; G06K 9/6231; G06K 9/6256; G06K 9/6263
See application file for complete search history.

(56) References Cited

U.S. PATENT DOCUMENTS 9,679,258 B2    6/2017  Mnih et al.
9,892,364 B2 *  2/2018  Tang .................... G06N 10/00
(Continued)

OTHER PUBLICATIONS

Castro et al., "Automatic Construction of Temporally Extended Actions for MDPs Using Bisimulation Metrics", Recent Advances in Reinforcement Learning—9th European Workshop, EWRL 2011, Sep. 2011, 13 pages.

(Continued)

*Primary Examiner* — Gregory M Desire
(74) *Attorney, Agent, or Firm* — Tutunjian & Bitetto, P.C.; Randy Emilio Tejeda

(57) ABSTRACT

A method is provided for detecting a higher-level action from one or more trajectories of real states. The trajectories are based on an experts' action demonstration. The method trains predictors to predict future states. Each predictor has a different duration of the higher-level action to be detected. The method predicts, using the predictors, the future states using past ones of the real states in the one or more trajectories as inputs for the predictors. The method determines if a match exists between any of the future states relative to a real future state with a corresponding same duration from the one or more trajectories. The method outputs a pair that includes the matching one of the future states as a prediction input and the real future state with the corresponding same duration from the one or more trajectories as the higher-level action corresponding thereto, responsive to the match existing.

20 Claims, 9 Drawing Sheets

(51) Int. Cl.
 *G06K 9/62* (2022.01)
 *G06N 3/08* (2006.01)
(52) U.S. Cl.
 CPC ......... *G06K 9/6256* (2013.01); *G06K 9/6263* (2013.01); *G06N 3/049* (2013.01); *G06N 3/08* (2013.01); *G06N 5/022* (2013.01)

(56) References Cited

U.S. PATENT DOCUMENTS

| | | | |
|---|---|---|---|
| 10,216,189 B1 * | 2/2019 | Haynes | B60W 30/095 |
| 10,591,914 B2 * | 3/2020 | Palanisamy | G06N 5/045 |
| 10,814,870 B2 * | 10/2020 | Abrahams | B60W 10/04 |
| 10,873,782 B2 * | 12/2020 | Lomada | H04N 21/25891 |
| 11,055,732 B2 * | 7/2021 | Sun | H02J 3/466 |
| 11,126,179 B2 * | 9/2021 | Karasev | G01S 13/931 |
| 2017/0061283 A1 | 3/2017 | Rasmussen et al. | |
| 2018/0319015 A1 | 11/2018 | Sinyavskiy et al. | |
| 2019/0030713 A1 | 1/2019 | Gabardos et al. | |

OTHER PUBLICATIONS

Bacon et al., "The Option-Critic Architecture", Proceedings of the Thirty-First AAAI Conference on Artificial Intelligence (AAAI-17), Jun. 2017, pp. 1726-1734.

* cited by examiner

DISCOVERING HIGHER-LEVEL ACTIONS FROM EXPERT'S ACTION DEMONSTRATION

BACKGROUND

The present invention generally relates to machine learning, and more particularly to discovering higher-level actions from an experts' action demonstration.

A problem exists in that temporally-extended high-level actions have to be discovered for easing planning and Reinforcement Learning (RL). However, states and action space are often too complicated for a planner or RL. Hence, there is a need for an approach to discovering temporally-extended high-level actions.

SUMMARY

According to an aspect of the present invention, a computer-implemented method is provided for detecting a higher-level action from one or more trajectories of real states. The one or more trajectories are based on an experts' action demonstration. The method includes training, by a hardware processor, a plurality of predictors to predict future states. Each of the predictors has a different duration of the higher-level action to be detected. The method further includes predicting, by the hardware processor using the predictors, the future states using past ones of the real states in the one or more trajectories as inputs for the predictors. The method also includes determining, by the hardware processor, if a match exists between any of the future states relative to a real future state with a corresponding same duration from the one or more trajectories. The method additionally includes outputting, by the hardware processor, a pair that includes the matching one of the future states as a prediction input and the real future state with the corresponding same duration from the one or more trajectories as the higher-level action corresponding thereto, responsive to the match existing.

According to another aspect of the present invention, a computer program product is provided for detecting a higher-level action from one or more trajectories of real states. The one or more trajectories are based on an experts' action demonstration. The computer program product includes a non-transitory computer readable storage medium having program instructions embodied therewith. The program instructions are executable by a computer to cause the computer to perform a method. The method includes training, by a hardware processor, a plurality of predictors to predict future states. Each of the predictors has a different duration of the higher-level action to be detected. The method further includes predicting, by the hardware processor using the predictors, the future states using past ones of the real states in the one or more trajectories as inputs for the predictors. The method also includes determining, by the hardware processor, if a match exists between any of the future states relative to a real future state with a corresponding same duration from the one or more trajectories. The method additionally includes outputting, by the hardware processor, a pair that includes the matching one of the future states as a prediction input and the real future state with the corresponding same duration from the one or more trajectories as the higher-level action corresponding thereto, responsive to the match existing.

According to yet another aspect of the present invention, a computer processing system is provided for detecting a higher-level action from one or more trajectories of real states. The one or more trajectories are based on an experts' action demonstration. The system includes a memory for storing program code. The system further includes a hardware processor for running the program code to train a plurality of predictors to predict future states. Each of the predictors has a different duration of the higher-level action to be detected. The hardware processor further runs the program code to predict, using the predictors, the future states using past ones of the real states in the one or more trajectories as inputs for the predictors. The hardware processor also runs the program code to determine if a match exists between any of the future states relative to a real future state with a corresponding same duration from the one or more trajectories. The hardware processor additionally runs the program code to output a pair that includes the matching one of the future states as a prediction input and the real future state with the corresponding same duration from the one or more trajectories as the higher-level action corresponding thereto, responsive to the match existing.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
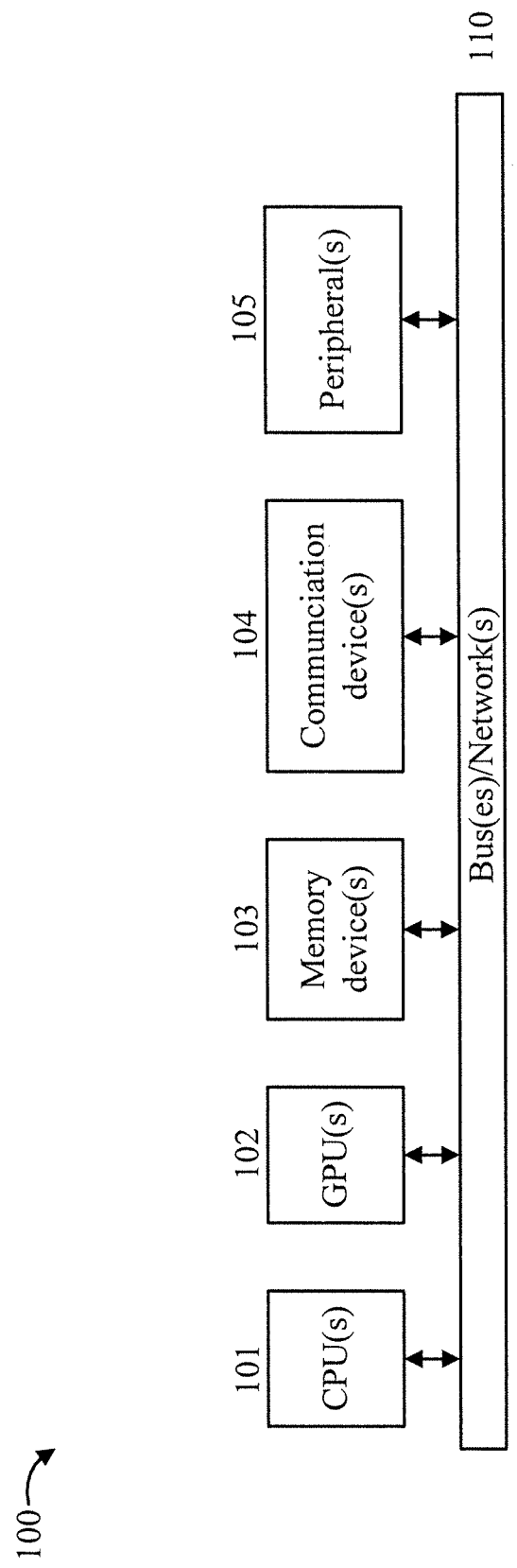
FIG. 1 is a block diagram showing an exemplary processing system to which the present invention may be applied, in accordance with an embodiment of the present invention.

The present invention is directed to discovering higher-level actions from an experts action demonstration.

In an embodiment, an approach is provided for unsupervised discovery of subtasks which involves training an ensemble of multilayer-perceptrons to predict state transitions over a range of time durations. The network has an hourglass structure and the loss function is used as metric to identify bottlenecks where a low loss value represents a predictable outcome and thus a likely candidate for an subtask. The approach can discover subtasks in open-ended task domains, where the environments provide few constraints on actions taken by an agent e.g., an agent that uses tools to design a solution. The subtasks are discovered in an unsupervised manner through observing demonstrations i.e., without annotations or reward signals.

In an embodiment, an approach is provided for analyzing transition timings in the loss function between different networks in the ensemble which improves robustness and protects against misidentifying options that have superficial similarities to other options.

In an embodiment, an automated, unsupervised approach is provided for detecting a frequently occurring, locally consistent sequence of state transformations from the observations as a high-level task is performed. The transformations in the detected sequence should correspond to a certain high-level subtask which we wish to discover and identify in a given sequence. For example, when a human sees a video sequence of a person reaching for a cup, although the arm goes through a sequence of many small motions, we simply identify it as the consistent goal of reaching for a cup. If the agent knows how to produce this high-level action sequence then it should be possible to use it, either as a macro action for classical planning, or a method for HTN, or an option for HRL. The system is capable of first discovering subtasks by observing demonstrations of a high-level task without annotations. The system can then detect the initiation and predict the completion time for a subtask it has learned.

In an embodiment, the system includes an ensemble of neural networks, where each unit of the ensemble has a specific duration constant D as a hyperparameter. Each unit predicts D-steps into the future from the current state, and is trained with examples of state pairs ($s_t$; $s_{t+D}$) taken from a pool of observed trajectories. The difficulty in training such a network is that a randomly sampled example from the pool is unlikely to be a pair of states that correspond to the beginning and end of a subtask. Herein, several novel methods of online batch processing are provided that allow the networks to stably converge toward predicting meaningful subtasks. Once a network is adequately predicting future states, these predictions are compared to the actual state transitions that occur and the error provides a metric to estimate the likelihood that the subtask occurred.

Hence, in an embodiment, the present invention can discover higher-level actions (e.g., draw a green box) from temporal sequences of actions (e.g., move left, plot green, move up, plot green, and so forth). For example, the present invention can discover a "draw a green box" higher-level action from (lower-level) actions of "move left", "plot green", "move up", "plot green", and so forth.

One or more embodiments of the present invention have been shown to generate shorter plans, reduce the complexity of choosing actions, provide robustness against model misspecification, improve exploration by taking shortcuts in the environment, and so forth, as readily appreciated by one of ordinary skill in the art given the teachings of the present invention provided herein.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 8-9). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
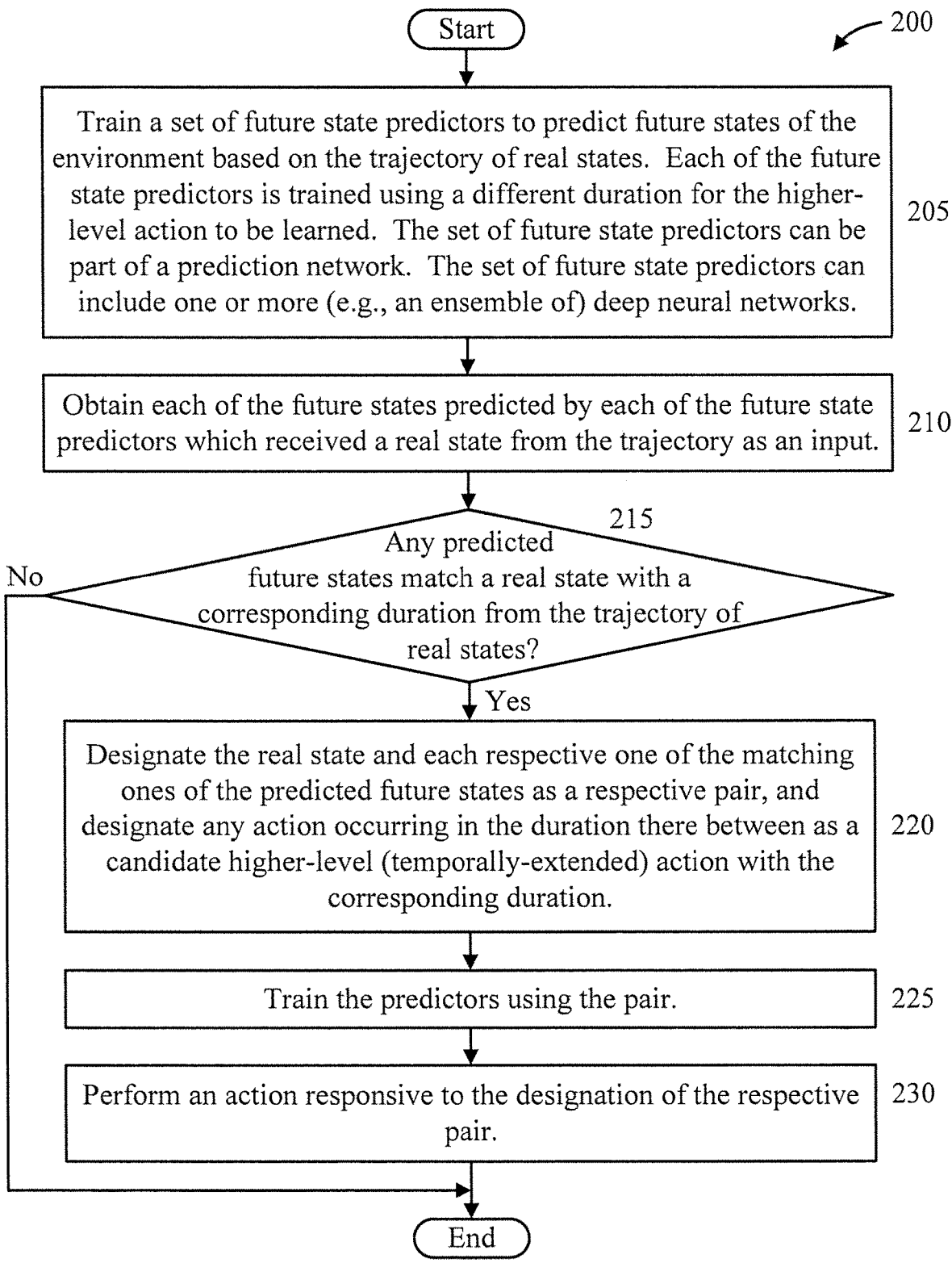
FIG. 2 is flow diagram showing an exemplary method for extracting the start and the end of a temporally-extended option (higher-level action) from given demonstrated trajectories of real states derived from an experts' action demonstration in a Reinforcement Learning (RL) environment, in accordance with an embodiment of the present invention.

FIG. 2 is flow diagram showing an exemplary method 200 for extracting the start and the end of a temporally-extended option (higher-level action) from given demonstrated trajectories of real states derived from an experts' action demonstration in a Reinforcement Learning (RL) environment, in accordance with an embodiment of the present invention. In an embodiment, prediction by networks is used to detect or extract action sequences corresponding to a temporally-extended option candidate. A purpose of method 200 is to seek any matching subsequences of states of a certain duration (e.g., number of states or time) in given demonstrated state trajectories. Here, the term "matching" refers to the predicted state for the start state of the subsequence with any predictor of the same duration. It is to be appreciated that later stages of method 200 can involve finding multiple options from many samples from a trajectory or trajectories. For the sakes of illustration and simplicity, method 200 is directed to the steps taken for each sample sub-trajectory, but can be readily extended to find multiple options from many samples from a trajectory or trajectories by one of ordinary skill in the art, while maintaining the spirit of the present invention.

At block 205, train a set of future state predictors to predict future states of the environment based on the trajectory of real states. Each of the future state predictors is trained using a different duration for the higher-level action to be learned. In an embodiment, the set of future state predictors can be part of a prediction network. In an embodiment, the set of future state predictors can include one or more (e.g., an ensemble of) deep neural networks.

At block 210, obtain each of the future states predicted by each of the future state predictors which received a real state from the trajectory as an input.

At block 215, determine if any of predicted future states match a real state with a corresponding duration from the trajectory of real states.

If so, then proceed to block 220. Otherwise, terminate the method.

At block 220, designate the real state and each respective one of the matching ones of the predicted future states as a respective pair, and designate any actions occurring in the duration there between as a candidate higher-level (temporally-extended) action with the corresponding duration.

At block 225, train the predictors using the pair(s).

At block 230, perform an action responsive to the designation of the respective pair(s). For example, the action can be and/or otherwise involve forming an action plan that includes the pair or a member of the pair. For example, a plan title and/or overall goal can be identified as one of the members of the pair. As another example, a search can be conducted using the "broader" detected action as a search basis in place of the "narrower" constituent actions in order to broaden the search and avoid any results "slipping through" due to what could have been a narrower search. As yet another example, one or more shortcuts can be suggested and/or otherwise automatically taken in a sequence of actions when the overall broader action is determined by the present invention, thus bypassing one or more intermediate but unnecessary actions in order to arrive at a goal action at a quicker pace than if every action, including the unnecessary actions, are performed. Further examples include, but are not limited to, an option (temporary-extended abstract action) discovery process in which we cluster similar sub-trajectories and infer state conditions for the option start and end, to give a hierarchical reinforcement learning system an additional option of the discovered higher-level action in selecting its action to take as well as the original lower-level actions.

Figure 3:
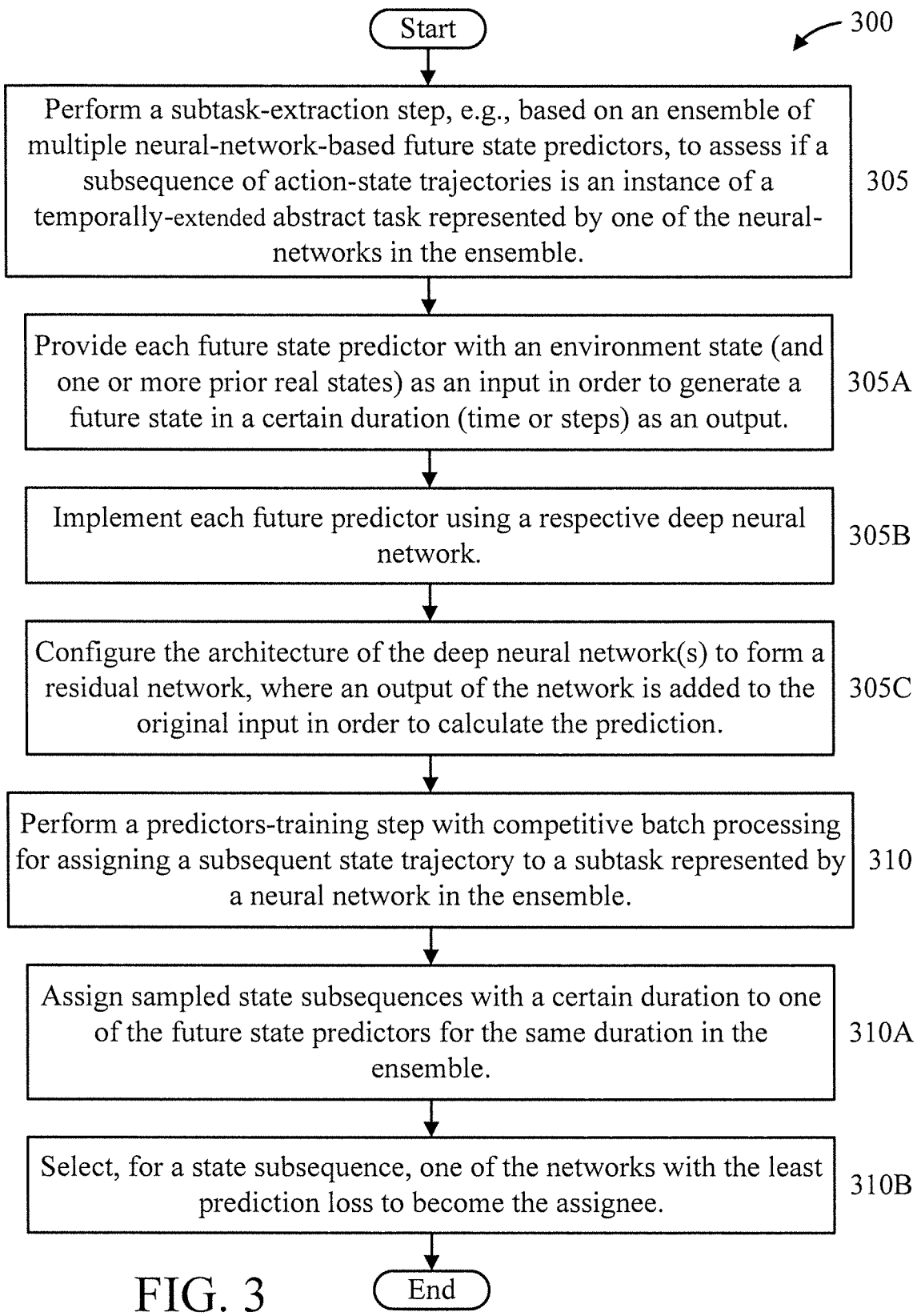
FIG. 3 is flow diagram showing an exemplary method for discovering sub-tasks (higher-level actions) from environmental state trajectories by an experts' action demonstration, in accordance with an embodiment of the present invention.

FIG. 3 is flow diagram showing an exemplary method 300 for discovering sub-tasks (higher-level actions) from environmental state trajectories by an experts' action demonstration, in accordance with an embodiment of the present invention.

At block 305, perform a subtask-extraction step, e.g., based on an ensemble of multiple neural-network-based future state predictors, to assess if a subsequence of action-state trajectories is an instance of a temporally-extended abstract task represented by one of the neural-networks in the ensemble. As used herein, the term "temporally-extended abstract task" refers to a higher-level task that includes multiple tasks.

In an embodiment, block 305 can include one or more of blocks 305A-305C.

At block 305A, provide each future state predictor with an environment state (and one or more prior real states) as an input in order to generate a future state in a certain duration (time or steps) as an output.

At block 305B, implement each future predictor using a respective deep neural network.

At block 305C, configure the architecture of the deep neural network(s) to form a residual network, where an output of the network is added to the original input in order to calculate the prediction. The residual network can be used to skip one or more layers in order to go from a particular input to a particular output.

At block 310, perform a predictors-training step with competitive batch processing for assigning a subsequent state trajectory to a subtask represented by a neural network in the ensemble.

In an embodiment, block 310 can include one or more of blocks 310A-310B.

At block 310A, assign sampled state subsequences with a certain duration to one of the future state predictors for the same duration in the ensemble.

At block 310B, select, for a state subsequence, one of the networks with the least prediction loss to become the assignee.

Figure 4:
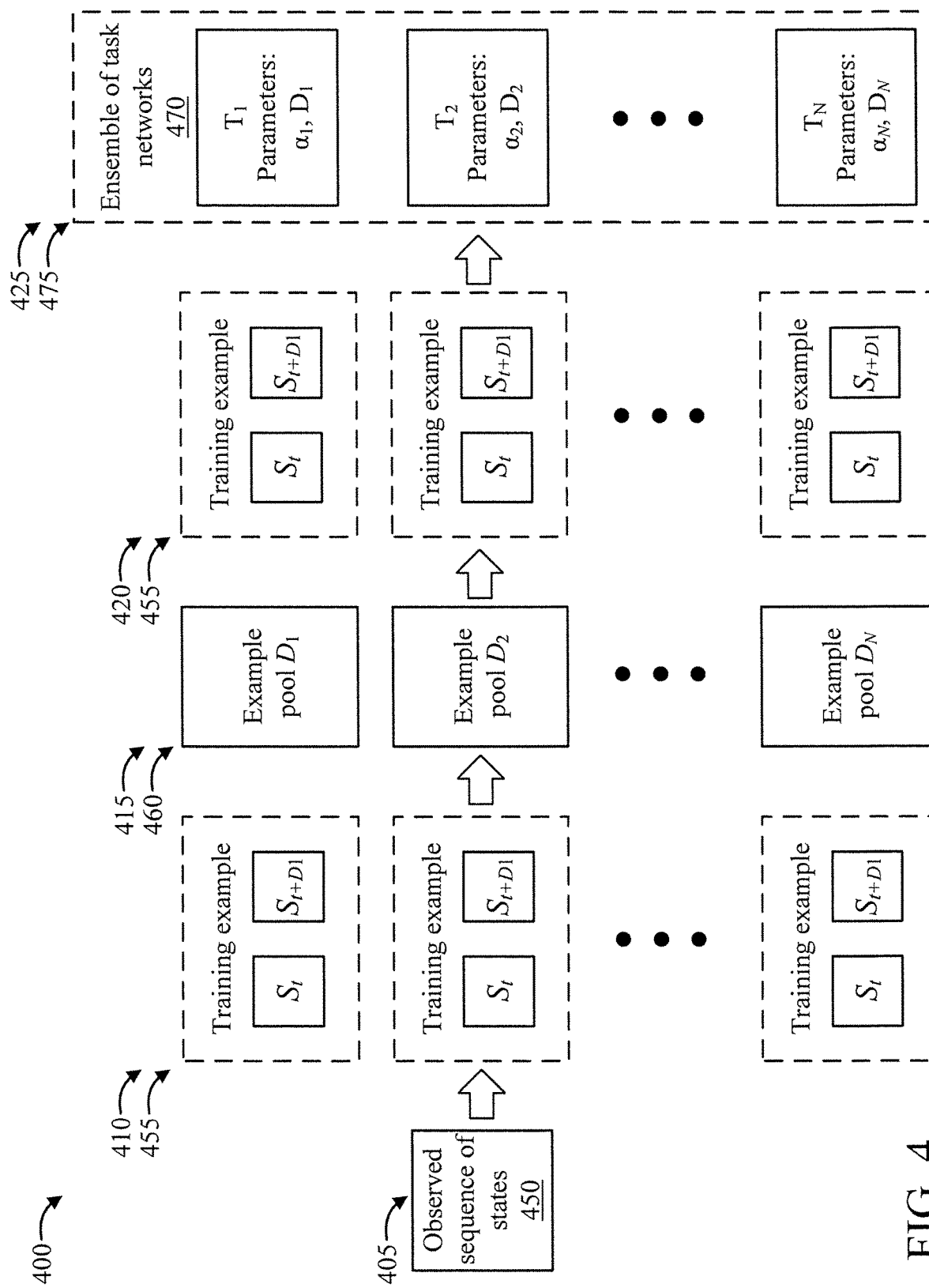
FIG. 4 is a high-level block diagram showing an exemplary training process for training a predictor of actions, in accordance with an embodiment of the present invention.

FIG. 4 is a high-level block diagram showing an exemplary training process 400 for training a predictor of actions, in accordance with an embodiment of the present invention.

At block 405, provide an observed sequence of states (expert) 450 as an input to the training process 400.

At block 410, generate training examples 455 from the observed sequence of states 405. D denotes the duration of the task to be learned.

At block 415, form example pools ($D_1$ through $D_N$) 460 from the training examples 455.

At block 420, perform sampling with random duration D.

At block 425, form an ensemble ($T_1$ through $T_N$) 475 of task networks 470. α controls a sensitivity of a prediction network by adjusting a threshold.

Figure 5:
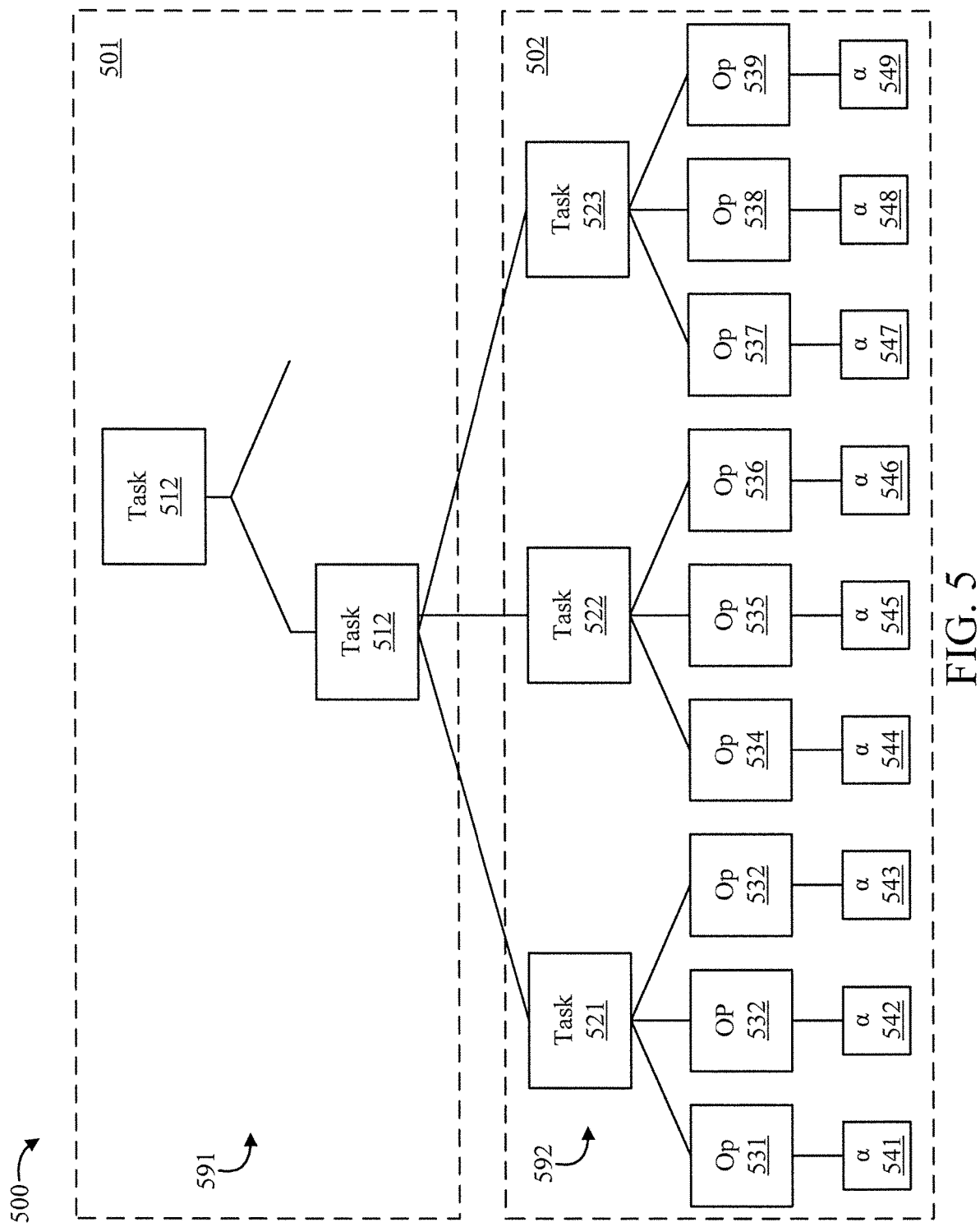
FIG. 5 is a block diagram showing an exemplary (higher-level) task discovery hierarchy, in accordance with an embodiment of the present invention.

FIG. 5 is a block diagram showing an exemplary (higher-level) task discovery hierarchy 500, in accordance with an embodiment of the present invention.

The task discovery hierarchy 500 can be considered to include two regions, namely a planning region 501 and a Reinforcement Learning (RL) region 502.

The planning region 501 includes tasks 511 and 512.

The RL region 502 includes tasks 521, 522, and 523, primitive operations (OP) 531-539, and sensitivity parameters a 541-549.

The tasks 510 and 511 in the planning region can be considered high level tasks 591, while the tasks 511, 512, and 513 in the RL region 502 can be considered middle (mid) level tasks 592.

Figure 6:
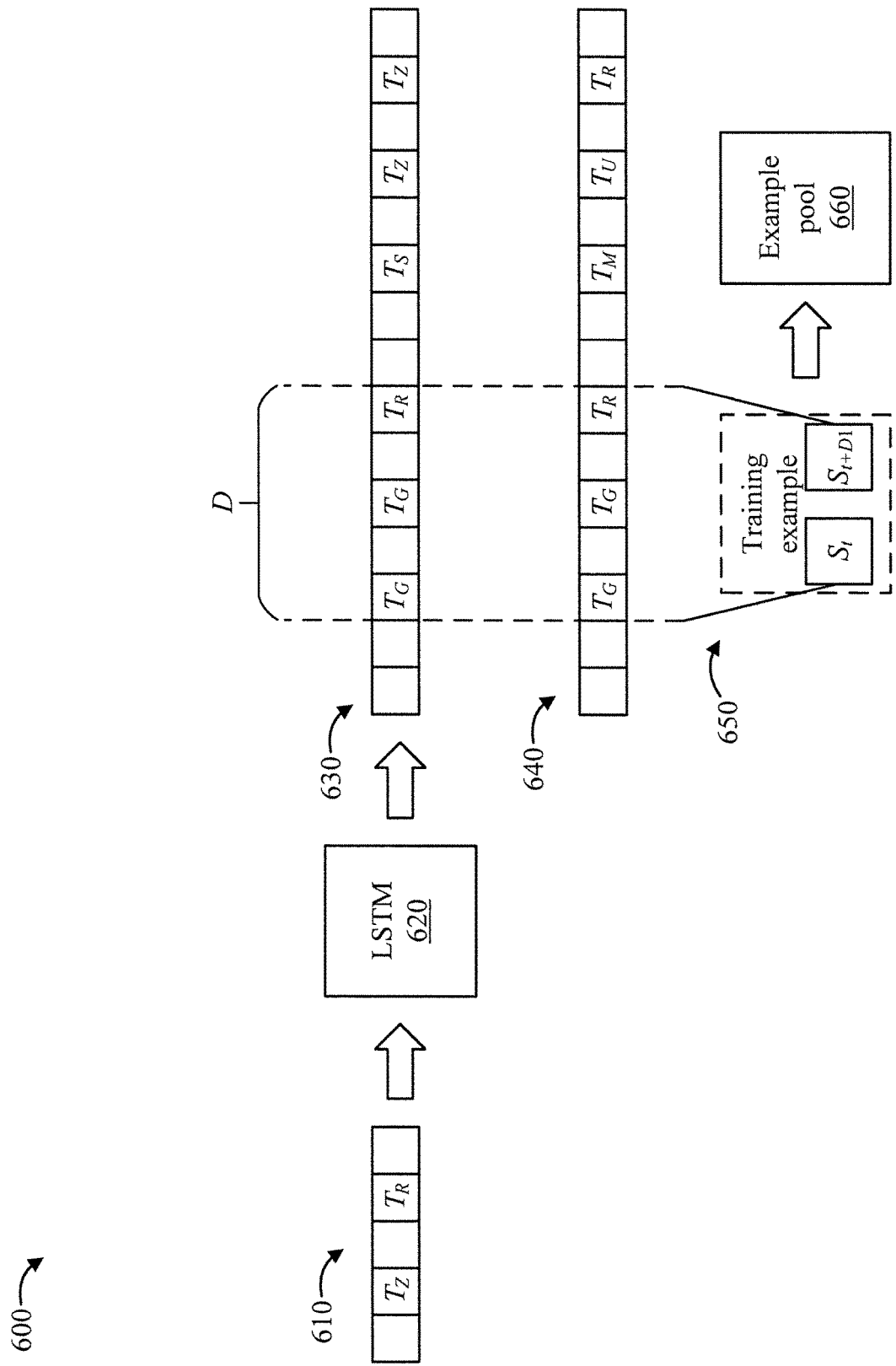
FIG. 6 is a block diagram showing an exemplary training example, in accordance with an embodiment of the present invention.

FIG. 6 is a block diagram showing an exemplary training example 600, in accordance with an embodiment of the present invention.

The stream of observed tasks 610 is used to train a Long Short-Term Memory (LSTM) 620 which then gives its own prediction 630 for a future sequence of tasks. These predicted sequences are not used directly. Instead, the prediction is recorded and is later compared to the actual observed stream 640. If the streams are similar for a duration D, then the states at the beginning and ending period of similarity are used to create a training example 650 which is added to the example pool 660. The training examples 650, which capture the state before and after a task is performed, is added to the example pool 660 in the hope that a task network can learn to identify the task based on the states. The duration D is the time during which the LSTM prediction 630 matches the actual observed stream 640.

The following shows exemplary pseudocode (aka Algorithm 1) for subtask extraction (using a network ensemble), in accordance with an embodiment of the present invention.

---
Algorithm 1 Subtask Extraction
---

Input: a state trajectory (plan) $\pi \leftarrow (s_1, s_2, ..)$,
    all the prediction network P
Output: $B_p$ for each $p \in P$
for each duration D do
    $P^{(D)} \leftarrow \{p \in P: p'\text{ task duration is }D\}$
    $B_p \leftarrow \{\}$ for each each $p \in P^{(D)}$
    for each t in D + 1, D + 2, .. , size ($\pi$) do
        $p_t^{(D)} \leftarrow \underset{p \in P^{(D)}}{\arg\min} \text{Loss}(\hat{g}_{tran}^{(p)}(s_{t-D}), s_t)$ $L_t^{(D)} \text{Loss}\left(\hat{g}_{tran}^{(p_t^{(D)})}(s_{t-D}), s_t\right)$ if $L_t^{(D)} <$ Threshold then
            add $(s_{t-D}, .. , s_t)$ to $B_{p_t^{(D)}}$
        end if
    end for
end for

---

The following shows exemplary pseudocode (aka Algorithm 2) for competitive batch processing (training a network ensemble), in accordance with an embodiment of the present invention.

---
Algorithm 2 Competitive Batch Processing
---

Input: all the batches B
    all the prediction networks P
Output: $B_p$ for each $p \in P$
for each duration D do
    $B^{(D)} \leftarrow \{B \in B : B\text{'s task duration is }D\}$
    $P^{(D)} \leftarrow \{p \in P : p\text{'s task duration is }D\}$
    $B_p \leftarrow \underset{B \in B^{(D)}}{\arg\min} \text{Loss}(\hat{g}_{tran}^{(p)}(s_{first}), s_{last})$
    where $B = s_{first}, .. , s_{last}$
    add B to $B_p$
    remove B from $B^{(D)}$
    end while
end for

---

Figure 7:
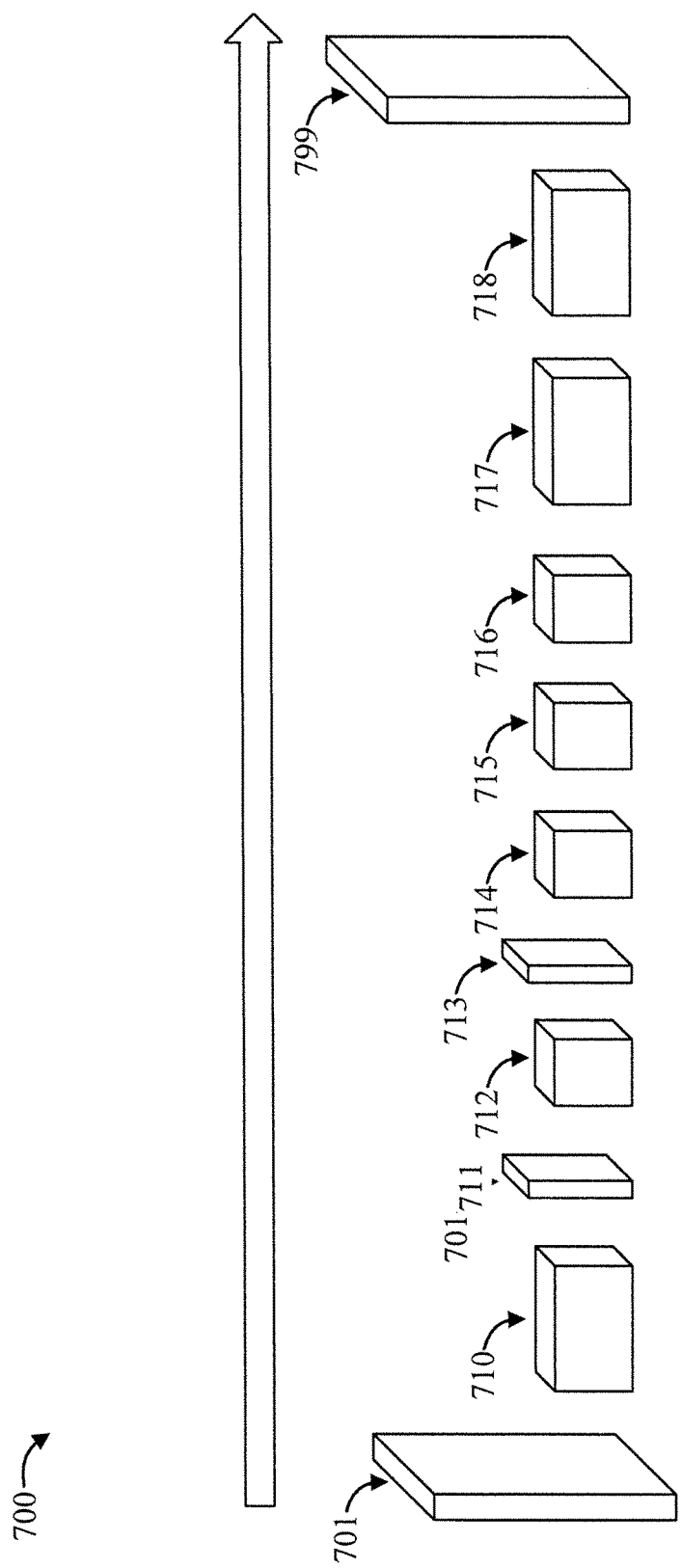
FIG. 7 is a diagram showing an exemplary Neural Network (NN) architecture to which the present invention can be applied, in accordance with an embodiment of the present invention.

FIG. 7 is a diagram showing an exemplary Neural Network (NN) architecture 700 to which the present invention can be applied, in accordance with an embodiment of the present invention.

An input 701 to the NN architecture 700 is a 16×16×3 image.

The NN 700 architecture includes a convolutional (cony) 3×3×16 layer 710, a max pooling layer 711, a convolutional 3×3×8 layer 712, a max pooling layer 713, a convolutional 3×3×8 layer 714, a two-dimensional (2D) transformation 3×3×8 layer 715, a 2D transformation 3×3×8 layer 716, a 2D transformation 3×3×16 layer 717, and a convolutional 3×3× 16 layer 718.

An output 799 of the NN architecture 700 is a 16×16×3 image.

A description will now be given regarding a subtask extraction problem, in accordance with one or more embodiments of the present invention.

Consider the Markov Decision Process (MDP), (S, A, F) which models an agent that takes actions, a EA, which cause transitions in state s E S according to some transition distribution function $F=P(s_{t+1}|a_t, s_t)$. We observe the state transitions as the agent takes actions according to some unknown (possibly non-optimal) agent which accomplishes a task T. For example, this agent could be an agent following some policy, a classical planning agent, or even a human. It is desired to learn about the structure of the search space associated with T from this state trajectory. Specifically, we would like understand the original search space S as a graph of higher-level subtasks that provides a temporal abstraction.

A subtask g is defined by a function of the probability that a given state satisfies the initial conditions of the subtask, $g_{init} \rightarrow S[0, 1]$, a duration D and a mapping function $g_{tran}(s_t)=s_{t+D}$. Though the duration may vary depending on initial conditions, it is our goal to (1) discover a set of subtasks which are commonly observed, (2) identify when a subtask begins and ends within an observed state trajectory. To this end, we define an ensemble of N subtask prediction networks $P=p_0, \ldots p_N$ (prediction network for short), each of which provides an estimate for $g_{init}$ and $g_{tran}$. Each prediction network maintains a fixed duration D as a hyperparameter. In the limiting case where D=1 and $g_{init}=1$, a valid subtask can take any transition function of a fundamental action in the MDP as $g_{tran}$. On the other extreme, the task itself could be considered a valid subtask. However, we are interested in segmenting the task by extracting sub-tasks with duration less than T but much greater than that of a single action. This range is a hyperparameter which must be set to appropriately for the MDP domain, ideally set by a hyperparameter tuning method or preparing a sufficiently large number of units in the ensemble.

It is important to note that the concept of a subtask significantly differs from that used in classical planning, where primitive actions are only partially ordered (aka Partially Ordered Planning) and the achievement of one subtask could be interleaved with another with no additional cost. The difference comes from the assumption that in the classical setting actions are already sufficiently high-level. For example, in a logistic domain with multiple trucks each transporting packages, a sequential decision making agent could interleave the subtask of moving a truck $t_1$ to a location $l_1$ and a truck $t_2$ to a location $l_2$ by alternating the steps of actions needed for each subtask. This does not happen in our scenario, since it is assumed that (1) the sequence of actions taken by the agent to produce the original observation is locally consistent, and that (2) the actions are sufficiently low-level (such as actuating an arm) that interleaving actions from the different subtasks would have inconsistent and unusable results.

The dataset used for training the ensemble is a set of state trajectories (plan) $\pi=(s_0, s_1, \ldots)$ of unspecified length. For each prediction network p with duration D, we sample from state pairs $(s_t, s_{t+D})$ separated by D time steps from each other.

A description will now be given regarding a network ensemble, in accordance with one or more embodiments of the present invention.

We extract subtasks by first creating an ensemble of prediction networks where the duration D of each prediction network is assigned (and fixed) to cover the entire range of possible values that are of interest. These prediction networks are incrementally improved by learning from observations based on D. Empirically, prediction networks with values of D that correspond to discoverable subtasks will outperform other prediction networks. Removing the low-performing prediction networks leaves a set of prediction networks that can estimate subtasks of the original task T.

A description will now be given regarding a network ensemble, in accordance with an embodiment of the present invention. Even if the duration of the prediction network is known for a given subtask, learning $g_{tran}$ is difficult since, without labeling or annotation, there is nothing to indicate the beginning and ending of a subtask within a sequence of observations. Estimating $g_{init}$ is also difficult because semantically similar states must be identified without prior knowledge.

We propose a novel method of training a neural network (NN), $\hat{g}_{tran}(s_t)$ to approximate $g_{tran}(s_t)$. The structure of the NN resembles an hourglass, defining a prediction loss based on a future state. The network is trained through stochastic gradient descent by bootstrapping from a pool of pairs of state observations that are separated by a time interval D.

If $\hat{g}_{tran}$ can be trained to make a good estimate of state transition caused by a subtask then its prediction loss can be used as a metric to determine when the sub-task occurred. Concretely, for $p \in P$ we define $L_{pt} = \text{Loss}(\hat{g}_{tran}*s_{t-D}), s_t)$. If $L_p <$Threshold at time t, then we can estimate that the subtask defined by this prediction network was initiated at t−D and completed at t. Thus, $\hat{g}_{tran}$ provides an explicit approximation of $g_{tran}$ and also the implicit approximation, $$\hat{g}_{init}(s_{t-D}) = \begin{cases} 1 & \text{if } P_{pt} < \text{Threshold} \\ 0 & \text{otherwise} \end{cases}$$

The variable Threshold can be dynamic, relative to the recent average loss value. Herein, for the sake of illustration, Threshold=$\text{Loss}_{avg}*\beta$ with $\beta=0.8$, as a simple thresholding rule. Of course, other variants can also be used.

While NNs are known to be strong general function approximators, in this case we would like the NN to have a low prediction loss only when the subtask of interest occurs and have a high loss at other times. It is this discrepancy in loss that makes it a good metric for determining if a subtask has occurred. This is because the loss will be used to determine if the associated subtask occurred. Therefore, we train each unit of the network ensemble in a way that it encourages it to focus on a specific type of transition.

To achieve this, an additional training phase is introduced in which the SGD training batches are preprocessed as follows: Examples with low loss are kept, samples with mid-level loss are removed from the batch, and for samples with high loss the transitioned state $s_{t+D}$ of the example pair is distorted with a small amount (5% in our case) of Gaussian noise with the mean and variance of the entire state trajectory $(s_t, s_{t+1}, \ldots s_{t+D})$. Viewing the NN as a generative function conditioned on a state, this training phase has the effect of instigating mode collapse. The network learns to accurately predict future states when the confidence is high, but also to destroy the predictions when the confidence is low. By doing so, the network's loss value can be used as a metric for determining if the subtask was performed.

The ensemble of networks are trained in concert, with each drawing observations according to its' specific duration interval. After the training, as a postprocessing step, the ensemble is pruned, removing all but the top-K performing networks. This is also a hyperparameter chosen according to the nature of the T. Generally, K will determine the maximum number of subtasks which will be extracted.

A description will now be given regarding competitive batch processing, in accordance with one or more embodiments of the present invention.

Different subtasks with a same duration may confuse a network in our approach. To solve this multiple subtask problem, we propose a competitive batch processing which allows multiple networks to compete for examples from a mini-batch of training data.

Networks in the ensemble are grouped by duration and for each duration-group, a large batch of size $B_{large}=N_{size}(B_{mini})$ is randomly sampled from the dataset (pairs of $(s_t, s_{t+D})$ extracted from the pool of trajectories), where N is the number of networks in the duration-group and size($B_{mini}$) is the normal mini-batch size used for training. Each network creates a sorted list of the indexes of $B_{large}$ from least prediction loss to most prediction loss. Then, the networks take turns in a round robin fashion choosing examples to add to their own $B_{mini}$ as described in Algorithm 2. If the separate networks are randomly initialized, as is normally the case, then invariably, they will yield slightly different loss values for a given example, even after identical training. This slight variation in loss causes the networks to have slight variations in the order they prioritize examples for their mini-batches. The effect quickly compounds as differences in their mini-batches during training translates to further differences in their parameters and thus further differentiates their prioritization of examples.

It is to be noted that RL algorithms suffer from the Sparse Reward Problem, where rewards from an environment are given after long steps of state (and action) transitions. In an embodiment, the present invention, discovers higher-level task candidates, which can become temporally-extended high-level actions, to make such the steps shorter as a composition of less state transitions with high-level actions, rather than many state transitions with low-level actions. Reaching a state with a reward through a few steps enables RL with reward sparsity. These and other advantages are readily determined by one of ordinary skill in the art, given the teachings of the present invention provided herein.

A description will now be given of some of the technical impacts of the present invention, in accordance with one or more embodiments of the present invention.

The present invention is applicable to unconstrained environments with complicated states. Hence, the present invention can be applied to intractably large state spaces (e.g., 8@H×W) that are due to loose environmental constraints on actions taken by an agent. Also, the present invention enables extraction of subtasks from human experts' action demonstration in "construction/design domains", e.g., painting boxes with raw pixels. In an embodiment, the present invention can be configured to provide a useful metric for state similarity assessment, which can serve as a reward signal for reinforcement learning methods such as options. These and other technical impacts are readily determined by one of ordinary skill in the art given the teachings of the present invention provided herein.

A description will now be given of some of the business impacts of the present invention, in accordance with one or more embodiments of the present invention.

One business impact is that a large step is provided by the present invention toward an automatically abstracted action (task/option) hierarchy discovery by observing experts' action demonstration. Existing planners can solve more complicated problems in a practical time. Also, existing reinforcement learning techniques can optimize action policies more quickly. These and other business impacts are readily determined by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
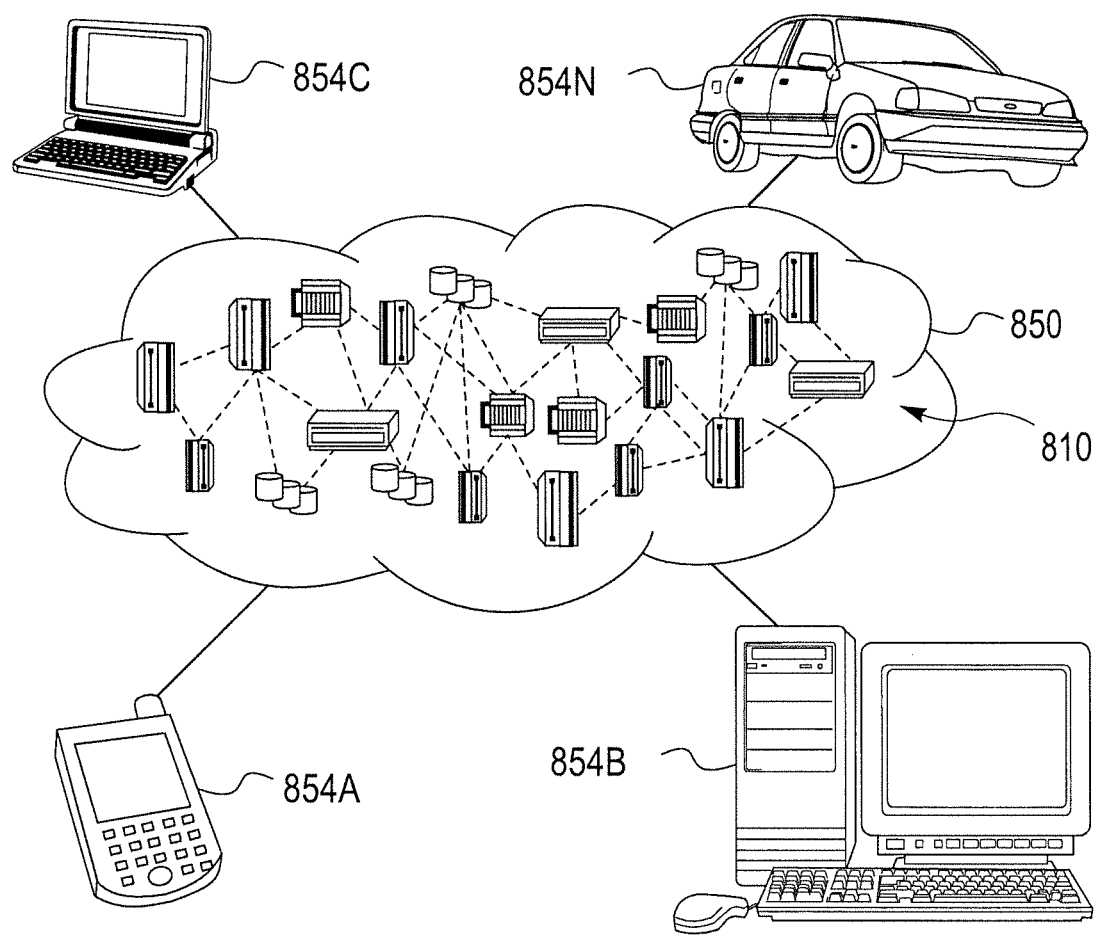
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
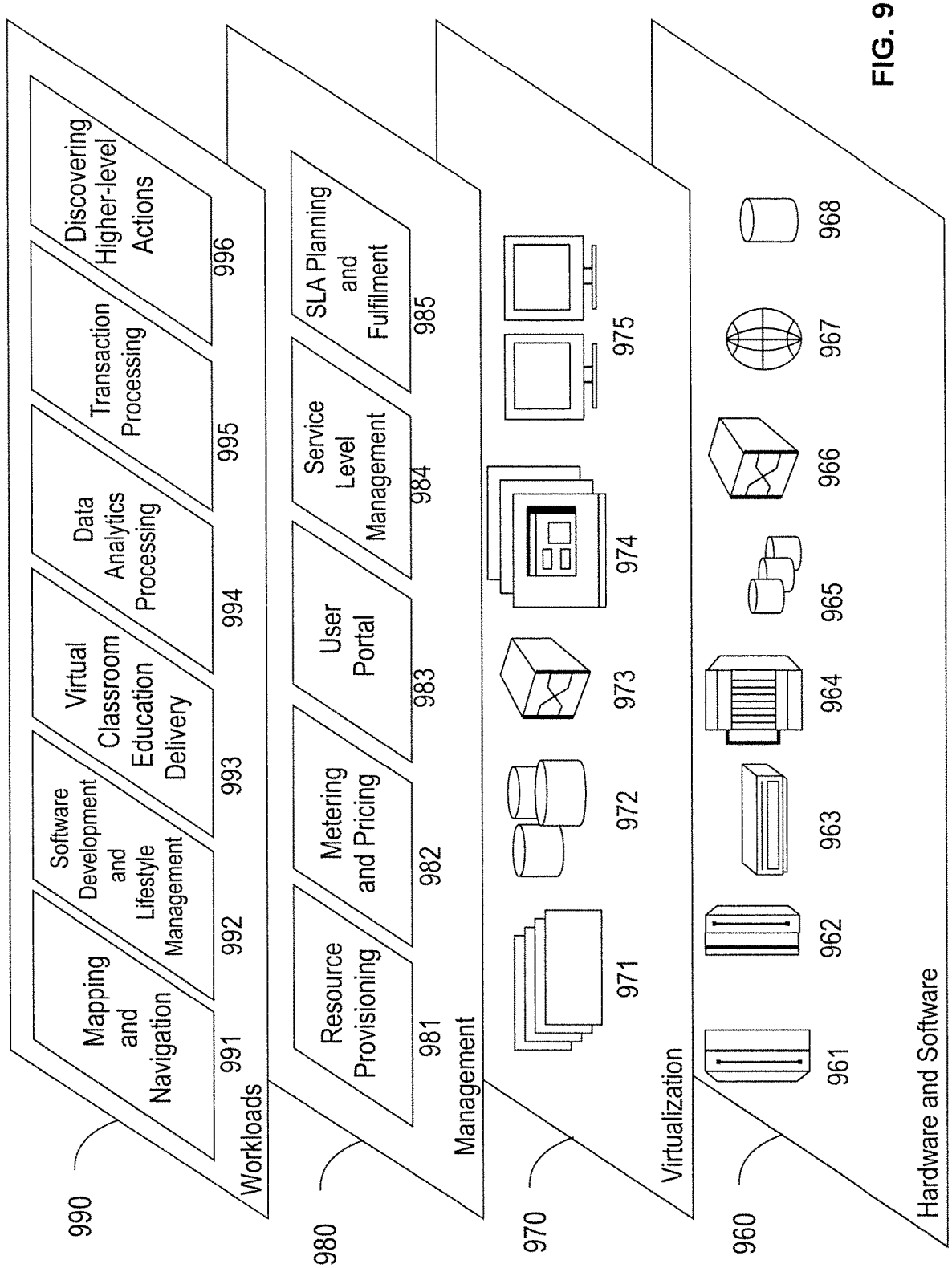
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and discovering higher-level actions from experts' action demonstrations 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for detecting a higher-level action from one or more trajectories of real states, the one or more trajectories based on an experts' action demonstration, the method comprising:
   training, by a hardware processor, a plurality of predictors to predict future states, each of the predictors having a different duration of the higher-level action to be detected;
   predicting, by the hardware processor using the predictors, the future states using past ones of the real states in the one or more trajectories as inputs for the predictors;
   determining, by the hardware processor, if a match exists between any of the future states relative to a real future state with a corresponding same duration from the one or more trajectories; and
   outputting, by the hardware processor, a pair that includes the matching one of the future states as a prediction input and the real future state with the corresponding same duration from the one or more trajectories as the higher-level action corresponding thereto, responsive to the match existing.

2. The computer-implemented method of claim 1, wherein said training step comprises:
   assigning sampled state subsequences with a certain duration to a given one of the predictors with the same duration as the certain duration; and
   keeping, as a training example, a given one of the sampled state subsequences for which a prediction loss of a corresponding one of the predictors is lowest.

3. The computer-implemented method of claim 2, wherein said assigning step is performed using competitive batch processing, and wherein each of the samples state subsequences corresponds to a respective one of a plurality of neural networks forming a neural network ensemble.

4. The computer-implemented method of claim 1, wherein each of the neural networks predicts a respective one of the futures states with the different duration corresponding thereto, so as to predict the future states across a plurality of durations.

5. The computer-implemented method of claim 1, wherein a prediction loss of each of the predictors, which is based on at least one of the future states, is used as a metric to determine when the higher-level action occurred.

6. The computer-implemented method of claim 1, wherein the plurality of predictors are implemented by a Long Short-Term Memory (LSTM).

7. The computer-implemented method of claim 1, wherein the plurality of predictors are implemented by a neural network configured as a residual network such that an output of the residual network is used to predict the future states.

8. The computer-implemented method of claim 1, wherein the plurality of predictors comprise an ensemble of Long Short-Term Memories (LSTMs).

9. The computer-implemented method of claim 1, wherein the input further comprises a current environmental state.

10. The computer-implemented method of claim 1, further comprising forming an action plan to affect the environment based on the pair.

11. The computer-implemented method of claim 1, further comprising performing a subsequent prediction operation comprising outputting the real future state with the corresponding same duration from the one or more trajectories as the higher-level action responsive to providing the matching one of the future states as the prediction input.

12. The computer-implemented method of claim 1, wherein the plurality of predictors are configured to have a prediction loss with a low value when the higher-level action occurs and a higher value than the low value at other times.

13. The computer-implemented method of claim 1, further comprising determining whether the higher-level action has occurred based on the prediction loss.

14. The computer program product of claim 1, wherein a prediction loss of each of the predictors, which is based on at least one of the future states, is used as a metric to determine when the higher-level action occurred.

15. A computer program product for detecting a higher-level action from one or more trajectories of real states, the one or more trajectories based on an experts' action demonstration, the computer program product comprising a non-transitory computer readable storage medium having program instructions embodied therewith, the program instructions executable by a computer to cause the computer to perform a method comprising:
 training, by a hardware processor, a plurality of predictors to predict future states, each of the predictors having a different duration of the higher-level action to be detected;
 predicting, by the hardware processor using the predictors, the future states using past ones of the real states in the one or more trajectories as inputs for the predictors;
 determining, by the hardware processor, if a match exists between any of the future states relative to a real future state with a corresponding same duration from the one or more trajectories; and
 outputting, by the hardware processor, a pair that includes the matching one of the future states as a prediction input and the real future state with the corresponding same duration from the one or more trajectories as the higher-level action corresponding thereto, responsive to the match existing.

16. The computer program product of claim 15, wherein said training step comprises:
 assigning sampled state subsequences with a certain duration to a given one of the predictors with the same duration as the certain duration; and
 keeping, as a training example, a given one of the sampled state subsequences for which a prediction loss of a corresponding one of the predictors is lowest.

17. The computer program product of claim 16, wherein said assigning step is performed using competitive batch processing, and wherein each of the samples state subsequences corresponds to a respective one of a plurality of neural networks forming a neural network ensemble.

18. The computer program product of claim 15, wherein each of the neural networks predicts a respective one of the futures states with the different duration corresponding thereto, so as to predict the future states across a plurality of durations.

19. The computer program product of claim 15, wherein the plurality of predictors are implemented by a Long Short-Term Memory (LSTM).

20. A computer processing system for detecting a higher-level action from one or more trajectories of real states, the one or more trajectories based on an experts' action demonstration, the system comprising:
 a memory for storing program code; and
 a hardware processor for running the program code to
  train a plurality of predictors to predict future states, each of the predictors having a different duration of the higher-level action to be detected;
  predict, using the predictors, the future states using past ones of the real states in the one or more trajectories as inputs for the predictors;
  determine if a match exists between any of the future states relative to a real future state with a corresponding same duration from the one or more trajectories; and
  output a pair that includes the matching one of the future states as a prediction input and the real future state with the corresponding same duration from the one or more trajectories as the higher-level action corresponding thereto, responsive to the match existing.

* * * * *